(12) United States Patent
Peet et al.

(10) Patent No.: US 10,988,630 B2
(45) Date of Patent: Apr. 27, 2021

(54) COATING COMPOSITIONS FOR BUILDING MATERIALS AND COATED BUILDING MATERIAL SUBSTRATES

(71) Applicant: CERTAINTEED CORPORATION, Malvern, PA (US)

(72) Inventors: Jeffrey H. Peet, Southborough, MA (US); Sam Yuan, Lansdale, PA (US); Timothy J. Coogan, West Boylston, MA (US)

(73) Assignee: CERTAINTEED CORPORATION, Malvern, PA (US)

( * ) Notice: Subject to any disclaimer, the term of this patent is extended or adjusted under 35 U.S.C. 154(b) by 616 days.

(21) Appl. No.: 14/971,516

(22) Filed: Dec. 16, 2015

(65) Prior Publication Data

US 2016/0185994 A1    Jun. 30, 2016

Related U.S. Application Data

(60) Provisional application No. 62/094,534, filed on Dec. 19, 2014.

(51) Int. Cl.
*C09D 109/08* (2006.01)

(52) U.S. Cl.
CPC .................. *C09D 109/08* (2013.01)

(58) Field of Classification Search
CPC .................................................. C09D 109/08
See application file for complete search history.

(56) References Cited

U.S. PATENT DOCUMENTS

| 3,879,493 | A | * | 4/1975 | Mudde | C08L 27/06 |
|---|---|---|---|---|---|
| | | | | | 521/134 |
| 4,102,845 | A | * | 7/1978 | Schroder | B41M 5/5254 |
| | | | | | 524/276 |
| 4,818,600 | A | | 4/1989 | Braun et al. | |
| 5,360,847 | A | * | 11/1994 | Dewacker | C04B 40/04 |
| | | | | | 427/393.6 |
| 5,681,385 | A | | 10/1997 | Beckenhauer | |
| 5,888,714 | A | | 3/1999 | Bourdelais et al. | |
| 5,897,411 | A | * | 4/1999 | Stark | D21H 19/40 |
| | | | | | 428/324 |
| 6,228,920 | B1 | * | 5/2001 | Topolkaraev | C08J 3/005 |
| | | | | | 524/377 |
| 6,316,687 | B1 | * | 11/2001 | Davis | A61F 13/15203 |
| | | | | | 604/372 |
| 6,346,353 | B1 | | 2/2002 | Wang | |
| 6,794,024 | B1 | * | 9/2004 | Walton | A61F 13/51458 |
| | | | | | 428/317.9 |
| 6,808,772 | B2 | | 10/2004 | Kunzel et al. | |
| 7,332,450 | B2 | | 2/2008 | Boylan | |
| 7,442,659 | B2 | | 10/2008 | Moll | |
| 7,745,357 | B2 | | 6/2010 | Smith et al. | |
| 7,745,928 | B2 | | 7/2010 | Smith et al. | |
| 7,851,052 | B2 | | 12/2010 | Caldwell | |
| 7,932,195 | B2 | | 4/2011 | Smith et al. | |
| 8,461,067 | B2 | | 6/2013 | Smith et al. | |
| 2002/0111422 | A1 | | 8/2002 | Back | |
| 2004/0209074 | A1 | | 10/2004 | Randall et al. | |
| 2005/0000183 | A1 | * | 1/2005 | Fay | E04B 1/7654 |
| | | | | | 52/506.01 |
| 2006/0059852 | A1 | | 3/2006 | Toas et al. | |
| 2006/0155031 | A1 | | 7/2006 | Wiercinski | |
| 2006/0178463 | A1 | | 8/2006 | Sacks | |
| 2006/0178466 | A1 | * | 8/2006 | Kim | B82Y 30/00 |
| | | | | | 524/445 |
| 2006/0217790 | A1 | | 9/2006 | Ota et al. | |
| 2007/0015424 | A1 | | 1/2007 | Toas et al. | |
| 2007/0036949 | A1 | | 2/2007 | Bogrett et al. | |
| 2007/0112128 | A1 | * | 5/2007 | Weitzel | C08L 31/04 |
| | | | | | 524/557 |
| 2007/0232743 | A1 | | 10/2007 | Laviolette et al. | |
| 2007/0283652 | A1 | | 12/2007 | Chen et al. | |
| 2007/0287019 | A1 | * | 12/2007 | Chen | C08K 5/09 |
| | | | | | 428/511 |
| 2008/0145681 | A1 | * | 6/2008 | Toas | D04H 1/56 |
| | | | | | 428/500 |
| 2008/0160280 | A1 | * | 7/2008 | Chen | B32B 27/08 |
| | | | | | 428/221 |
| 2008/0311813 | A1 | | 12/2008 | Ting et al. | |
| 2009/0152268 | A1 | | 6/2009 | Whiteman et al. | |
| 2010/0203790 | A1 | | 8/2010 | Moulton et al. | |

(Continued)

FOREIGN PATENT DOCUMENTS

| CA | 2536438 A1 | 8/2006 |
|---|---|---|
| CN | 102676028 A | 9/2012 |

(Continued)

OTHER PUBLICATIONS

British Plastics Federation (http://www.bpf.co.uk/plastipedia/polymers/ABS_and_Other_Specialist_Styrenics.aspx[Jan. 28, 2019 10:12:01 AM]) (Year: 2019).*
Samariha et al. (Ciencia y tecnologia 17(3): 637-646, 2015) (Year: 2015).*
Sigma-Aldrich (https://www.sigmaaldrich.com/catalog/product/mm/821039?lang=en&region=US[Jan. 28, 2019 12:25:33 PM]) (Year: 2019).*
Aqua-Calc.com, (https://www.aqua-calc.com/page/density-table/substance/mica-coma-and-blank-solid[Jan. 28, 2019 1:06:11 PM]) (Year: 2019).*
Azo Materials (https://www.azom.com/properties.aspx?ArticleID=1844[Jan. 28, 2019 12:26:54 PM]) (Year: 2019).*
International Search Report for PCT/US2014/071694 dated Apr. 13, 2015, 1 page.

(Continued)

*Primary Examiner* — Liam J Heincer (74) *Attorney, Agent, or Firm* — Abel Schillinger, LLP; Thomas H. Osborn (57) ABSTRACT

Embodiments of the present disclosure are directed to coating compositions, coated articles, and methods in which the coated article is adapted to exhibit a particular permeance profile, such as, for example, a variable water vapor perm rating of about 1 perm or less at 25% average RH and about 15 perms or more at 95% average relative humidity, as tested by ASTM E96 at 21° C.

20 Claims, 1 Drawing Sheet

(56) References Cited

U.S. PATENT DOCUMENTS

| | | |
|---|---|---|
| 2010/0310893 A1 | 12/2010 | Derbyshire et al. |
| 2011/0151225 A1* | 6/2011 | Bowe .................. C09D 125/10 |
| | | 428/220 |
| 2011/0190405 A1* | 8/2011 | Delaviz ................. C08J 9/0061 |
| | | 521/81 |
| 2012/0077400 A1* | 3/2012 | Flood .................... B32B 5/245 |
| | | 442/76 |
| 2012/0228182 A1* | 9/2012 | Ting ........................ C08J 7/047 |
| | | 206/524.3 |
| 2012/0231170 A1 | 9/2012 | Cao et al. |
| 2012/0301712 A1* | 11/2012 | Bayless .................... C09D 5/08 |
| | | 428/339 |
| 2012/0328811 A1 | 12/2012 | Patel et al. |
| 2013/0260162 A1* | 10/2013 | Fickert .................. D21H 19/44 |
| | | 428/514 |
| 2013/0295364 A1* | 11/2013 | Saavedra ................. A23B 7/16 |
| | | 428/220 |
| 2015/0176211 A1 | 6/2015 | Knapp et al. |
| 2016/0015851 A1* | 1/2016 | Chiou .................. A61L 15/225 |
| | | 604/372 |
| 2016/0032143 A1* | 2/2016 | Wolbers ............... C09D 133/08 |
| | | 427/385.5 |
| 2016/0263859 A1* | 9/2016 | Rao ........................... B32B 7/12 |

FOREIGN PATENT DOCUMENTS

| | | |
|---|---|---|
| EP | 1010807 A1 | 6/2000 |
| JP | S646068 A | 1/1989 |
| JP | H03287672 A | 12/1991 |
| JP | H0921096 A | 1/1997 |
| JP | H10158994 A | 1/1997 |
| JP | 2000220094 A | 8/2000 |
| JP | 2000303026 A | 10/2000 |
| JP | 2001511835 A | 8/2001 |
| JP | 2002013216 A | 1/2002 |
| JP | 2008019295 A | 1/2008 |
| JP | 2008527107 A | 7/2008 |
| JP | 2009274287 A | 11/2009 |
| JP | 2011514917 A | 5/2011 |
| JP | 2012127886 A | 7/2012 |
| JP | 2012528900 A | 11/2012 |
| JP | 2013508465 A | 3/2013 |
| JP | 2013527866 A | 7/2013 |
| KR | 20010012593 A | 2/2001 |
| KR | 20070053779 A | 5/2007 |
| KR | 20070095917 A | 10/2007 |
| WO | 2003078734 A1 | 9/2003 |
| WO | 2005030860 A1 | 4/2005 |
| WO | 2007146391 A2 | 12/2007 |
| WO | 2008119887 A1 | 10/2008 |
| WO | 2011139481 A1 | 11/2011 |
| WO | 2013164646 A1 | 11/2013 |
| WO | 2015095786 A1 | 6/2015 |
| WO | 2015095805 A1 | 6/2015 |

OTHER PUBLICATIONS

International Search Report for PCT/US2014/071652 dated Apr. 10, 2015, 1 page.
Fluorinated Chemicals, ChemicalSafetyFacts.org, May 12, 2017, 6 pg., http://www.chemicalsafetyfacts.org/fluorinated-chemicals/post/.
Air Products, Ancarez TM AR555 Waterborne Epoxy, Technical Bulletin, 2010, pp. 1-16.
BASF, Additive selection guide for surface modifying, dispersion and rheology additives, BASF additives at a glance, 2010, pp. 1-24.
BASF, Technical Information, Efka FA 4642. Aug. 2012, pp. 1-2.
3M Stain Resistant Additive SRC-220 for Use as a Stain Resistant Additive, 2008, pp. 1-4.

* cited by examiner

COATING COMPOSITIONS FOR BUILDING MATERIALS AND COATED BUILDING MATERIAL SUBSTRATES

CROSS-REFERENCE TO RELATED APPLICATION(S)

This application claims priority under 35 U.S.C. § 119(e) to U.S. Patent Application No. 69/094534 entitled "COATING COMPOSITIONS FOR BUILDING MATERIALS AND COATED BUILDING MATERIAL SUBSTRATES," by Jeffrey H. Peet, et al., filed Dec. 19, 2014, which is assigned to the current assignee hereof and incorporated herein by reference in its entirety.

TECHNOLOGICAL FIELD

This application is related to coatings for building materials. More particularly, certain embodiments described herein are directed to coatings effective to provide a coated substrate to have variable water vapor permeance values as a function of relative humidity (RH).

BACKGROUND

Building materials can include films or facing materials attached to them to provide desired physical properties. The film or facing material typically includes petroleum products, which can result in substantial off-gassing of volatile organic compounds (VOCs) during preparation and/or use of the material.

Currently available products suffer from the ability to maintain desired water vapor permeance at a low relative humidity. Moreover, current coating formulations can not be used with porous substrates, such as porous nonwovens. Innovative solutions are therefore needed to provide novel coating compositions which can be used on a variety of different substrates, including, for example, porous substrates and in particular porous nonwoven substrates, while providing desired water vapor permeance, particularly at low relative humidity.

BRIEF DESCRIPTION OF THE FIGURES

Certain embodiments are described with reference to the accompanying figures in which.

It will be recognized by the person of ordinary skill in the art, given the benefit of this disclosure, that certain dimensions or features in the figures may have been enlarged, distorted or shown in an otherwise unconventional or non-proportional manner to provide a more user-friendly version of the figures. Where dimensions or values are specified in the description below, the dimensions or values are provided for illustrative purposes only. Reference to front, back, top and bottom are provided for exemplary purposes and are not limiting.

DETAILED DESCRIPTION

In general, the present disclosure is directed to a coating composition for building material substrates and coated substrates which can selectively retard water vapor as a function of humidity when cured. These concepts are better understood in view of the foregoing description.

The coating composition can generally include a hydrophobic component and a hydrophilic component.

In certain embodiments, the hydrophobic component can include a water insoluble polymer.

In particular embodiments, the water insoluble polymer can be provided to the coating composition as an aqueous dispersion such that the water insoluble polymer is dispersed in water.

In very particular embodiments, the hydrophobic component can include a latex. For example, the latex can include a latex of styrene butadiene, styrene acrylic, acrylic, vinyl acetate ethylene, vinylidene chloride, polyethylene, wax, polyvinyl chloride, polyvinyl butyral, polypropylene, butadiene or combinations thereof. In even more particular embodiments, the hydrophobic component can include a styrene butadiene latex.

In certain embodiments, the hydrophobic component can be described by its % carboxylation. % Carboxylation refers to the weight percentage of carboxylic acid monomer in the polymer backbone. Accordingly, in particular embodiments, the hydrophobic component can have a % carboxylation of essentially 0%, at least about 0.1%, at least about 0.5%, or even at least about 1%. In further embodiments, the hydrophobic component can have a % carboxylation of no greater than about 20%, no greater than about 15%, no greater than about 10%, no greater than about 5%, or even no greater than about 3%. Moreover, the hydrophobic component can have a % carboxylation in a range of any of the minimums and maximums provided above, such as in a range of from 0% to 20%, 0.1% to 15%, 0.5% to 10%, or even 1% to 8%. In very particular embodiments, the hydrophobic component can have a % carboxylation of about 0% in which case, the hydrophobic component would be essentially free of a carboxylic acid monomer in the polymer backbone.

A particular advantage of the above mentioned % carboxylation has been shown to be advantageous in achieving excellent permeance with relative humidity in combination with a hydrophilic component. Without wishing to be bound by theory, it is believed that at high levels of carboxylation the latexes tend to have too high a water vapor permeance at intermediate relative humidities.

In certain embodiments, the hydrophobic component can be described by its glass transition temperature (Tg). As used herein, the glass transition temperature (Tg) of the hydrophobic component is measured according to differential scanning calorimetry or dynamic mechanical analysis. Accordingly, in certain embodiments, the hydrophobic component can have a glass transition temperature (Tg) of at least about −50° C., at least about −40° C., or even at least about −30° C. In further embodiments, the hydrophobic component can have a glass transition temperature (Tg) of no greater than about 35° C., no greater than about 25° C., no greater than about 25° C. or even no greater than about 15° C. Moreover, the hydrophobic component can have a glass transition temperature in a range of any of the minimums and maximums provided above, such as in a range of from −30 to 25° C., −30 to 15° C., or even −30 to 0° C.

In certain embodiments, the hydrophobic component can be present in the composition or barrier layer in an amount of at least about 15 wt. %, at least about 25 wt. %, at least about 35 wt %, or even at least about 45 wt. % based on the total dry weight of the hydrophobic & hydrophilic components of the barrier layer. In further embodiments, the hydrophobic component can be present in the composition or barrier layer in an amount of no greater than about 99 wt %, no greater than about 98 wt. %, or even no greater than about 97 wt. % based on the total dry weight of the hydrophobic & hydrophilic components of the barrier layer. Moreover, the hydrophobic component can have a content within the composition or barrier layer in a range of any of the minimums and maximums provided above, such as in a range of from 15 wt. % to 99 wt. %, 25 wt. % to 98 wt. %, or even 35 wt. % to 97 wt. % based on the total dry weight of the hydrophobic & hydrophilic components of the barrier layer.

As mentioned above, in certain embodiments, in addition to the hydrophobic component, the composition can contain a hydrophilic component. The hydrophilic component can serve to absorb moisture and increase the permeance of the composition at elevated relative humidity.

In particular embodiments, the hydrophilic component can include a polymer which, in the absence of cross-linking, is soluble in water.

In certain embodiments, the hydrophilic component can include polyvinyl alcohol (PVOH), poly(vinyl pyrolidone), starch, cellulose, salts of polyacrylic acid, poly acrylic acid, highly carboxylated latexes, amines, polyethylene oxide, vinyl ethers, highly hydrolyzed polymers (eg, hydrolyzed maleic anhydride), polysaccharides or combinations thereof. In very particular embodiments, the hydrophilic component can include polyvinyl alcohol (PVOH) or sodium polyacrylate.

In particular embodiments, the composition can include more than one hydrophilic component. For example, and as will be discussed in more detail below, the composition can include a hydrophilic filler in substitution of or in addition to the hydrophilic component options mention above, such as PVOH. In particular embodiments, the hydrophilic filler can be an inorganic hydrophilic filler, such as Kaolin.

In certain embodiments, the hydrophilic components can be described by its % water absorption. As used herein, the % water absorption is determined by gravimetric measurements as is well understood in the art. Percentage of water absorption will increase the permeance vs. relative humidity relationship, but if it is too high the hydrophilic component may become soluble and destabilize the film.

In certain embodiments, the hydrophilic component can include a polymer having a percent water absorption of at least about 0.5%, at least about 2%, at least about 5%, or even at least about 7% as measured at 100% relative humidity and at 23° C. In further embodiments, the hydrophilic component can include a polymer having a percent water absorption of no greater than about 20%, no greater than about 15%, or even no greater than about 10% as measured at 100% relative humidity and at 25° C. Moreover, the hydrophilic component can have a percent water absorption in a range of any of the minimums and maximums provided above, such as in a range of from about 0.5% to about 20%, or even about 7% to about 10%.

In certain embodiments, the hydrophilic component can be described by its molecular weight. By using a high molecular weight material which is only soluble at high temperature, dissolution of the hydrophilic component at low temperatures can be avoided.

In certain embodiments, the hydrophilic component can have a weight average molecular weight of at least about 50000. In further embodiments, the hydrophilic component can have a molecular weight of no greater than about 300000. Moreover, the hydrophilic component can have a molecular weight in a range of any of the minimums and maximums provided above, such as in a range of from 50000 to 300000.

In certain embodiments, the hydrophilic component can be present in the composition or barrier layer in an amount of at least about 0.1 wt. %, at least about 0.5 wt. %, or even at least about 1 wt. %, based on the total dry weight of the hydrophobic & hydrophilic components. In further embodiments, the hydrophilic component can be present in the composition or barrier layer in an amount of no greater than about 40 wt. %, no greater than about 30 wt. %, no greater than about 25 wt. %, no greater than about 20 wt. %, no greater than about 15 wt. %, no greater than about 10 wt. %, or even no greater than about 8 wt. %, based on the total dry weight of the hydrophobic & hydrophilic components. Moreover, the hydrophilic component can be present in the composition or barrier layer in an amount in a range of any of the minimums and maximums provided above, such as in a range of from 0.1 wt. % to 35 wt. %, or even 1 wt. % to 15 wt. %, based on the total dry weight of the hydrophobic & hydrophilic components.

In certain embodiments, the composition can optionally further include desired additive components, such as inorganic fillers, viscosity modifiers, pigments, dyes, UV absorbers, slip additives, surfactants, biocides, defoamers, deaerators, or combinations thereof.

In particular embodiments, the composition can include a filler. In very particular embodiments, the composition can have a filler content of no greater than about the critical pigment volume concentration of the filler. For example, the critical pigment volume concentration of the filler is the concentration above which the binder does not fully occupy the voids between the pigment particles. For example, it can be measured by oil absorption of the pigment. The CPVC can vary from 20-68 volume percent, but the values are commonly around 50-55%.

In certain embodiments, the filler can include a clay, a montmorillonite, a calcium carbonate, a barium sulfate, a bentonite, a muscovite, an illite, a cookeite, a kaolonite, a chlorite or other filler materials. The filler may comprise inorganic materials, organic materials or combinations thereof. Specific fillers can include kaolin clay, $CaCO_3$, $CaSO_4$, $BaSO_4$, silica, talc, carbon black, diatomaceous earth, alumina, titania, or combinations thereof. In some preferred embodiments, fillers with platelike morphologies such as Kaolin clay can increase the slope of the permeance vs relative humidity relationship. This is due to the increased tortuosity of the films and can allow coatings to be applied thinner and have superior performance. In some examples, the filler may provide reinforcement in the cured coating, may provide flame retardancy in the cured coating, may improve the physical properties of the cured composition (e.g., decrease the coefficient of linear thermal expansion (CLTE) as compared to the CLTE of a cured composition without the filler), or may provide other desired features, e.g., may increase the overall viscosity of the composition to facilitate more uniform coating on a substrate. Illustrative commercially available fillers include, but are not limited to, Bentolite®, Cloisite®, Nanofil®, Nanothix®, and Permont® fillers available from Southern Clay Products, Inc.

In certain embodiments, the filler can be present in the composition in a range of from 0 wt % to 85 wt %, based on the total dry weight of the composition or barrier layer.

In certain examples, the dispersions can include one or more biocidal agents. The biocidal agent can be effective to deter or prevent growth of organisms on the coating and/or surface of the substrate. In some embodiments, the biocidal agent can be effective as a fungicide, e.g., a moldicide, to prevent growth of mold or other fungus on the surface of the substrate. In other embodiments, the biocidal agent can be effective to prevent growth of bacteria, moss, algae or other organisms on the surface of the substrate. Where present, the biocidal agent may be present in an effective amount to deter or prevent growth of bio organisms.

In some embodiments, the dispersions can include stain-resistance additives. In some examples, the stain-resistance additive can act to reduce or prevent materials from being adsorbed into the coating and can generally assist in sealing the coating from penetration by materials other than water and gases. For example, the stain-resistance additive can provide oil resistance or oil repellency to prevent non-polar species from becoming trapped in the coating. The stain-resistance additives may also inhibit fading of the coating if exposed to heat, ultraviolet light or other forms of energy. Illustrative stain-resistance additives are commercially available, for example, from 3M (e.g., SRC-220, PM-5000, PM-1680, PM-4800) and AkzoNobel (e.g., Elotex® stain-resistance additives).

Describing the composition as a whole, the composition can have a particular ratio of the wt. % of the hydrophobic component to the hydrophilic component. For example, in certain embodiments, the ratio of the volume % of the hydrophobic component to the hydrophilic component can be at least about 3:1, at least about 10:1, or even at least about 30:1. In further embodiments, the ratio of the volume % of the hydrophobic component to the hydrophilic component can be no greater than about 200:1, or even no greater than about 100:1. Moreover, the ratio of the volume % of the hydrophobic component to the hydrophilic component can be in a range of any of the minimums and maximums provided above, such as in a range of from about 2:1 to about 200:1.

The composition can also have a desirable viscosity. For example, in particular embodiments, the composition can have a viscosity of at least about 1000 cps at a shear rate of 1 s at a temperature of 21° C. In further embodiments, the composition can have a viscosity of no greater than about 1000 cps at a shear rate of 1000 s$^1$ at a temperature of 21° C. Moreover, the composition can have a viscosity of at least about 5000 cps at a shear rate of 1 s$^{-1}$ a temperature of 21° C. and a viscosity of no greater than about 1000 cps at a shear rate of 1000 s$^{-1}$ at a temperature of 21° C.

The composition can also be described by properties after curing. As used herein, the cured composition is referred to the barrier layer. In particular embodiments, the barrier layer can have a particular coat weight. For example, the barrier layer can have a coat weight of at least about 10 gsm, at least about 20 gsm, or even at least about 40 gsm. In further embodiments, the barrier layer can have a coat weight of no greater than about 120 gsm. Moreover, the barrier layer can have a coat weight in a range of any of the minimums and maximums provided above, such as in a range of from about 10 gsm to about 120 gsm, or even from about 40 gsm to about 100 gsm.

The composition can be applied and cured and contain a variable water vapor permeability as a function of relative humidity. As discussed herein, the water vapor permeability can be measured according to ASTM E96 at a temperature of 21° C. at the selected average relative humidity (RH) values. The water vapor permeability is a measure of the amount of water vapor that can pass through a material. When used to describe a characteristic of a cured composition, the water vapor permeability is measured by coating the composition onto a point-bond polypropylene non-woven substrate with a coating weight of 75 gsm, and curing the composition. This way, the variable water vapor permeability can be standardized to a particular substrate for comparison and evaluation. The water vapor permeability is then measured according to ASTM E96 at a temperature of 21° C. at different relative humidities. Accordingly, in certain embodiments, the composition can be adapted to have a variable water vapor permeability as a function of relative humidity after applying and curing the composition onto a substrate.

In particular embodiments, the composition can exhibit a desirable water vapor permeability at low, medium, and high relative humidities.

For example, in certain embodiments, the composition can have a water vapor perm rating of 1 perm or less at 25% average RH.

In further embodiments, the composition can have a water vapor permeability rating of 5 perms or less, or even 2.5 perms or less at 45% average RH. In particular embodiments, the composition can have a water vapor permeability rating of 2.5 perms or less at 45% average RH.

In further embodiments, the composition can have a water vapor permeability rating in a range of from 6 perms to 12 perms at 75% average RH.

In further embodiments, the composition can have a water vapor permeability rating of at least about 12 perms, at least about 15 perms at 95% average RH, or even at least about 20 perms. In particular embodiments, the composition can have a water vapor perm rating of at least about 20 perms at 95% average RH.

The coating composition can further have various combinations of the water vapor permeability values provided above at the different relative humidities.

For example, in particular embodiments, the composition can have a water vapor permeability rating of about 1 perm or less at 25% average RH; and a water vapor permeability rating of at least about 20 perms at 95% average RH.

In further embodiments, the composition can have a water vapor permeability rating of about 1 perm or less at 25% average RH; a water vapor permeability rating of at least about 20 perms at 95% average RH; and a water vapor permeability rating of 5 perms or less, or even 2.5 perms or less at 45% average RH.

In yet further embodiments, the composition can have a water vapor permeability rating of about 1 perm or less at 25% average RH; a water vapor permeability rating of at least about 20 perms at 95% average RH; a water vapor permeability rating of 5 perms or less, or even 2.5 perms or less at 45% average RH; and a water vapor permeability rating in a range of from 6 perms to 12 perms at 75% average RH.

It is to be understood that the above recited combinations of water vapor permeability ratings at different relative humidities are exemplary combinations, and all possible combinations of the above recited water vapor permeability ratings in a composition are within the scope of the present disclosure.

It is further noted that when a coating displays the water vapor perm rating noted above at different RH values, the change in perm rating as humidity increases may, as noted herein, be linear or non-linear in a plot of the log of the permeance vs. the relative humidity.

Another aspect of the present disclosure is related to a coated substrate. For example, the composition described above can be coated onto a substrate and cured. A particular advantage of certain embodiments of the present disclosure is the ability of the composition described above to be used in conjunction with relatively porous substrates. For example, the characteristics of certain embodiments of the composition described herein can completely fill the void spaces within a porous substrate, and thereby provide an effective coating for retarding water vapor. Other compositions that could potentially provide a variable water vapor permeability as a function of humidity could not be used with relatively porous substrates, as the composition would "bleed through" the substrate and lead to discontinuous and ineffective coatings due to the low viscosity of the coating fluid. The current inventors surprisingly discovered the ability to synergistically combine an effective viscosity with a variable water vapor permeability enabling use on relatively porous substrates. However, it is to be understood that certain embodiments are not limited to the relatively porous substrates as the composition has also been found to have distinctly superior variability in water vapor permeability on its own.

Figure 1:
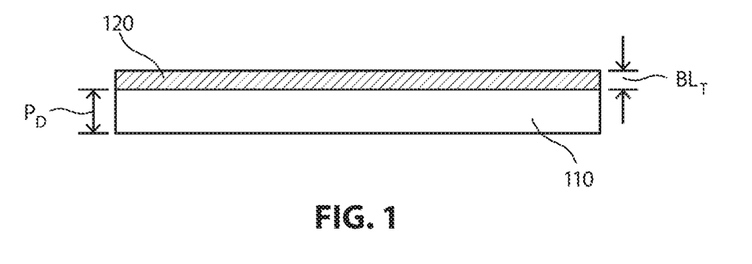
FIG. 1 illustrates a coated substrate according to one embodiment of the present disclosure.

In certain examples, the aqueous dispersions described herein can be used to provide a cured coating on a building substrate, e.g., kraft paper used for backing on fiberglass insulation, spun bond or point bond non-woven fabrics, oriented strand board or as a coating on a house wrap or other material used that can be used to seal a building envelope, such as gypsum. Referring to FIG. 1, an article 100 is shown comprising a substrate 110 with a coating 120 disposed thereon. The exact thickness of the substrate 110 and the coating 120 can vary, but in most cases the thickness of the substrate 110 will be substantially larger than the thickness of the coating 120. While the thickness of the coating 120 is shown as being substantially the same in the planar direction of the substrate 110, such uniformity is not required. In particular, so long as the thickness of the coating 120 is effective to provide the variable water vapor perm values described herein, the thickness need not be uniform in every area of the substrate 110.

In certain embodiments, the substrate 110 can be any suitable substrate commonly used in the building industry. For example, buildings typically have some form of insulation in the wall, floor and/or ceiling cavities. This insulation is often fiberglass insulation that can include a vapor retarder to prevent moisture from entering the insulated cavities. Common vapor retarders are kraft paper coated with asphalt. Kraft paper itself has a high rate of moisture transmission. When used with an asphalt coating and/or adhesive, the kraft paper can act as a suitable vapor retarder. Reduced moisture in the wall cavity can prevent deterioration of the building materials and a reduction in the thermal conductivity within the wall cavity, which can further assist in reduction of energy costs. In some instances, the substrate 110 may be kraft paper that can be applied to a larger building substrate, e.g., fiberglass insulation, using an adhesive or other suitable attachment means. The exact weight of the kraft paper can vary, and illustrative weights include, but are not limited to, about 25 pounds to about 75 pounds per thousand square feet, for example about 39 pounds. In some examples the substrate 110 is a fabric. In some examples the fabric could be woven or non-woven. In other instances, the coating can be applied directly to drywall or other materials commonly used to finish interior surfaces of a building structure. For example, gypsum boards can be coated with the coating to provide a gypsum wallboard with variable water perm ratings. Similarly, wood paneling, wood planks, plywood, fiber board or other materials used to finish exterior or interior walls or ceilings can be coated with the coating described herein to provide variable water vapor perm ratings. Additional building substrates that can be coated with the coating will be readily selected by the person of ordinary skill in the art, given the benefit of this disclosure.

In very particular embodiments, the substrate can include a kraft paper facing, a scrim, a polymer sheet, a gypsum wall board, or combinations thereof. In further particular embodiments, the substrate can be described as a synthetic substrate. Further, the substrate can be porous or contain a pore structure, such that the coating composition or barrier layer can be disposed within the pore structure of the substrate as will be discussed in more detail below. In very specific embodiments, the substrate can include a fabric, such as a synthetic fabric that has a pore structure as described herein.

In certain embodiments, the coating 110 can be disposed on the substrate 120 by rolling, spraying, roll coating or other means that can dispose a layer of the aqueous dispersion on the substrate. If desired, additional coating layers can be added to a cured coating layer to build up the thickness of the layers of the coating.

In particular embodiments, the substrate can include kraft paper facing.

In certain embodiments, the substrate can be a textile substrate. For example, a textile substrate can include woven and/or non-woven materials. In particular embodiments, the substrate can include a non-woven material. Particular non-woven materials can include spun bond or point bond fabrics.

In certain examples, the coatings provided herein can be used either to provide pre-coated building substrates or to permit on-site coating of building substrates. For example, fiberglass insulation batts with kraft paper can be pre-coated with one or more of the components followed by coating of an additional component on-site to provide the final operative coating. In other instances, the coating can be produced at the production site such that an installer need not do anything to provide the coating. In yet other cases, the installer may spray the coating onto a substrate after it has been installed to provide the coating on the installed substrate. In some instances, the substrate may be a porous substrate, such as a non-woven substrate.

In certain embodiments, the coated substrate can have certain desired characteristics.

In particular embodiments, the combined thickness of the substrate and the barrier layer can be at least about 25 microns, at least about 50 microns, or even at least about 100 microns. In further embodiments, the combined thickness of the substrate and the barrier layer can be no greater than about 1000 microns, no greater than about 800 microns, or even no greater than about 750 microns. Moreover, the combined thickness of the substrate and the barrier layer can be in a range of any of the minimums and maximums provided above, such as in a range of from 25 um to 1000 um.

Figure 2:
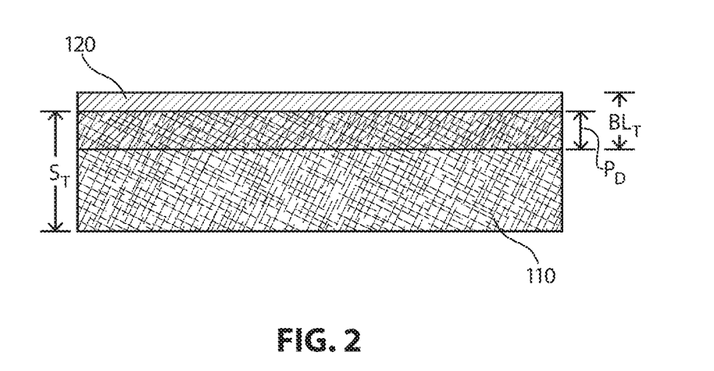
FIG. 2 illustrates a coated substrate where the coating penetrates a particular depth into the substrate according to one embodiment of the present disclosure.
Figure 3:
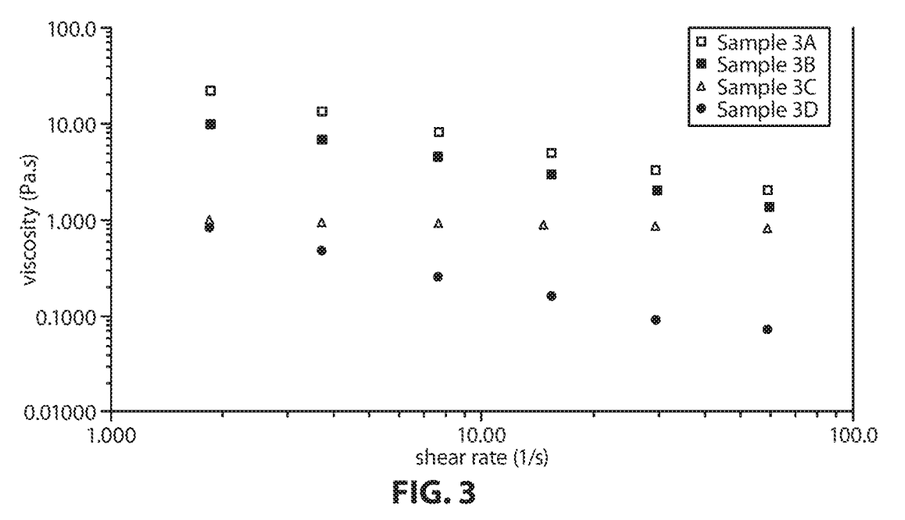
FIG. 3 illustrates a graph of the viscosity measurements of Example 3.

In certain embodiments, and referring in particular to FIG. 2, when the composition is coated and cured onto a relatively porous substrate 110, the barrier layer 120 can penetrate a desired depth $P_D$ into the substrate, and in particular embodiments, can not bleed through the entire substrate. For example, in certain embodiments, the substrate thickness ST can be greater than $P_D$ such that one major surface of the substrate is essentially free of the barrier layer. Further, the barrier layer can have a thickness $BL_T$ as indicated in FIG. 3 measured from the outermost surface of the barrier layer to the distance the barrier layer penetrates into the substrate.

Accordingly, in particular embodiments, the barrier layer can penetrate into the substrate by at least about 1%, at least about 5%, or even at least about 10% of the thickness of the substrate. In further embodiments, the barrier layer can penetrate into the substrate by no more than 95%, no more than 90%, or even no more than 85% of the thickness of the substrate.

Further, in particular embodiments, the barrier layer can penetrate into the substrate by at least about 1%, at least about 5%, or even at least about 10% of the thickness of the barrier layer. In further embodiments, the barrier layer can penetrate into the substrate by no more than 95%, no more than 90%, or even no more than 85% of the thickness of the barrier layer.

In other embodiments, the substrate can be completely saturated such that a continuous layer of the composition is disposed on both major surfaces of the substrate. For example, the $P_D$ can be greater than or equal to the ST. Further, the barrier layer can have a desirable thickness atop both major surfaces of the substrate.

Embodiments of the present disclosure can exhibit a very advantageous variable water vapor permeability which varies as a function of the relative humidity. Similar to the discussion above in relation to the composition, the coated article including the substrate and the composition can exhibit a desirable water vapor permeability at low, medium, and high relative humidities. As used herein the water vapor permeability is measured according to ASTM E96 at a temperature of 21° C.

Accordingly, in certain embodiments, the coated article can have a water vapor perm rating of about 2 perms or less, or even 1 perm or less at 25% average RH. In particular embodiments, the coated article can have a water vapor perm rating of about 1 perm or less at 25% RH.

In further embodiments, the coated article can have a water vapor permeability rating of at least about 12 perms, at least about 15 perms at 95% average RH, or even at least about 20 perms. In particular embodiments, the coated article can have a water vapor perm rating of at least about 20 perms at 95% average RH.

In further embodiments, the coated article can have a water vapor permeability rating of 5 perms or less, or even 2.5 perms or less at 45% average RH. In particular embodiments, the coated article can have a water vapor permeability rating of 2.5 perms or less at 45% average RH.

In further embodiments, the coated article can have a water vapor permeability rating in a range of from 6 perms to 12 perms at 75% average RH.

The coated article can further have various combinations of the water vapor permeability values provided above at the different relative humidities.

For example, in particular embodiments, the coated article can have a water vapor permeability rating of about 1 perm or less at 25% average RH; and a water vapor permeability rating of at least about 20 perms at 95% average RH.

In further embodiments, the coated article can have a water vapor permeability rating of about 1 perm or less at 25% average RH; a water vapor permeability rating of 5 perms or less, or even 2.5 perms or less at 45% average RH; and a water vapor permeability rating of at least about 20 perms at 95% average RH.

In yet further embodiments, the coated article can have a water vapor permeability rating of about 1 perm or less at 25% average RH; a water vapor permeability rating of 5 perms or less, or even 2.5 perms or less at 45% average RH; a water vapor permeability rating in a range of from 6 perms to 12 perms at 75% average RH; and a water vapor permeability rating of at least about 20 perms at 95% average RH.

It is to be understood that the above recited combinations of water vapor permeability ratings at different relative humidities are exemplary combinations, and all possible combinations of the above recited water vapor permeability ratings in a coated article are within the scope of the present disclosure.

It is further noted that when a coating displays the water vapor perm rating noted above at different RH values, the change in perm rating as humidity increases may, as noted herein, be linear or non-linear as a function of the logarithm of permeance versus relative humidity.

Another parameter of the article is the achievement of an advantageous nail tear resistance. The nail tear resistance is a measure of the article's ability to prevent tearing after a puncture. As used herein, the nail tear resistance is measured according to EIN 12310-1. Accordingly, the coated article can have a nail tear resistance of at least about 1 N/5 cm, at least about 5 N/5 cm, or even at least about 10 N/5 cm.

Yet another parameter of the article is its tensile strength. As used herein, tensile strength is measured according to EIN 12311-2. Accordingly, in certain embodiments, the coated article can have a tensile strength of at least about 10 N/5 cm, at least about 25 N/5 cm, or even at least about 40 N/5 cm. Further, in certain embodiments, the coated article can have a UV aged tensile strength of at least about 10 N/5 cm, at least about 25 N/5 cm, or even at least about 40 N/5 cm. As used herein, UV aged tensile strength is measured after UV aging for 180 hours at 0.5 W/m$^2$ Still yet another parameter to describe a characteristic of the article is its tape adhesion. Tape adhesion is a measure of the ability of the coated article to stick to and release from an adhesive tape. As used herein, tape adhesion is measured according to EIN 12317-2. Accordingly, the coated article can have a tape adhesion of at least about 15 N/5 cm, at least about 20 N/5 cm, or even at least about 25 N/5 cm.

Certain specific examples are described below to facilitate a better understanding of the technology described herein.

Item 1. A coating composition adapted to selectively retard water vapor as a function of humidity when cured, the composition comprising:
    a. a hydrophobic component; and
    b. a hydrophilic component;
    c. wherein the composition once cured is effective to provide a variable water vapor perm rating of about 1 perm or less at 25% average RH and about 15 perms or more at 95% average relative humidity, as tested by ASTM E96 at 21° C. and as tested by coating and curing the composition on a kraft paper.

Item 2. An article adapted to selectively retard water vapor as a function of humidity, the article comprising:
    a. a building material substrate; and
    b. a barrier layer disposed on the building material substrate, the barrier layer comprising:
        i. a hydrophobic component; and
        ii. a hydrophilic component;
    c. wherein the article has a water vapor perm rating of about 1 perm or less at 25% average RH and about 15 perms or more at 95% average relative humidity, as tested by ASTM E96 at 21° C.

Item 3. An article adapted to selectively retard water vapor as a function of humidity, the article comprising:
    a. a building material substrate comprising a textile having a pore structure; and
    b. a barrier layer disposed on the building material substrate;
    c. wherein the article has a water vapor perm rating of about 1 perm or less at 25% average RH and about 15 perms or more at 95% average relative humidity, as tested by ASTM E96 at 21° C.;

d. wherein at least about 10% of the barrier layer is embedded into the pore structure of the textile.

Item 4. An article adapted to selectively retard water vapor as a function of humidity, the article comprising:
a. a building material substrate comprising a non-woven fabric having a pore structure; and
b. a barrier layer;
c. wherein the article has a water vapor perm rating of about 1 perm or less at 25% average RH and about 15 perms or more at 95% average relative humidity, as tested by ASTM E96 at 21° C.;
d. wherein at least about 10% of the barrier layer is embedded into the pore structure of the non-woven fabric substrate.

Item 5. A method of forming an article adapted to selectively retard water vapor as a function of humidity, the method comprising:
a. providing a coating composition;
b. providing a substrate;
c. applying the composition to the substrate; and
d. drying the composition to thereby form a barrier layer on the substrate;
e. wherein the article has a water vapor perm rating of about 1 perm or less at 25% average RH and about 15 perms or more at 95% average relative humidity, as tested by ASTM E96 at 21° C.

Item 6. A method of forming an article adapted to selectively retard water vapor as a function of humidity, the method comprising:
a. providing a waterborne coating composition;
b. providing a building material substrate;
c. applying the composition to the building material substrate; and
d. drying the composition to thereby form a barrier layer on the building material substrate;
e. wherein the article has a water vapor perm rating of about 1 perm or less at 25% average RH and about 15 perms or more at 95% average relative humidity, as tested by ASTM E96 at 21° C.

Item 7. The composition, article or method of any one of the preceding items, wherein the hydrophobic component comprises a water insoluble polymer.

Item 8. The composition, article or method of any one of the preceding items, wherein the hydrophobic component comprises a water insoluble polymer dispersed in water.

Item 9. The composition, article or method of any one of the preceding items, wherein the hydrophobic component comprises a latex.

Item 10. The composition, article or method of any one of the preceding items, wherein the hydrophobic component comprises a latex of styrene butadiene, styrene acrylic, acrylic, vinyl acetate ethylene, vinylidene chloride, polyethylene, wax, polyvinyl chloride, polyvinyl butyral, polypropylene, butadiene or combinations thereof.

Item 11. The composition, article or method of any one of the preceding items, wherein the hydrophobic component comprises a styrene butadiene latex.

Item 12. The composition, article or method of any one of the preceding items, wherein the hydrophobic component has a % carboxylation of no greater than about 15%, no greater than about 10%, no greater than about 5%, or even no greater than about 3%.

Item 13. The composition, article or method of any one of the preceding items, wherein the hydrophobic component has a glass transition temperature (Tg) of no greater than about 35° C., no greater than about 25° C. or even, no greater than about 15° C.

Item 14. The composition, article or method of any one of the preceding items, wherein the hydrophobic component has a glass transition temperature (Tg) in a range of from −30 to 35° C., −30 to 25° C., or even −30 to 15° C.

Item 15. The composition, article or method of any one of the preceding items, wherein the hydrophobic component is present in the composition or barrier layer in an amount of at least about 15 wt. %, at least about 25 wt. %, at least about 35 wt %, or even at least about 45 wt. % based on the total dry weight of the hydrophobic & hydrophilic components.

Item 16. The composition, article or method of any one of the preceding items, wherein the hydrophobic component is present in the composition or barrier layer in an amount of no greater than about 99 wt %, no greater than about 98 wt. %, or even no greater than about 97 wt. % based on the total dry weight of the hydrophobic & hydrophilic components of the barrier layer.

Item 17. The composition, article or method of any one of the preceding items, wherein the hydrophobic component is present in the composition or barrier layer in a range of from 15 wt. % to 99 wt. %, 25 wt. % to 98 wt. %, or even 35 wt. % to 97 wt. % based on the total dry weight of the hydrophobic & hydrophilic components of the barrier layer.

Item 18. The composition, article or method of any one of the preceding items, wherein the hydrophilic component comprises a polymer which, in the absence of cross-linking, is soluble in water.

Item 19. The composition, article or method of any one of the preceding items, wherein the hydrophilic component comprises polyvinyl alcohol (PVOH), poly(vinyl pyrolidone), starch, cellulose, salts of polyacrylic acid, poly acrylic acid, highly carboxylated latexes, amines, polyethylene oxide, vinyl ethers, highly hydrolyzed polymers (eg, hydrolyzed maleic anhydride), polysaccharides or combinations thereof.

Item 20. The composition, article or method of any one of the preceding items, wherein the hydrophilic component comprises polyvinyl alcohol (PVOH) or sodium polyacrylate.

Item 21. The composition, article or method of any one of the preceding items, wherein the hydrophilic component comprises a hydrophilic filler.

Item 22. The composition, article or method of any one of the preceding items, wherein the hydrophilic component comprises an inorganic hydrophilic filler.

Item 23. The composition, article or method of any one of the preceding items, wherein the hydrophilic component comprises a polymer which, in the absence of cross-linking, is soluble in water and an inorganic hydrophilic filler.

Item 24. The composition, article or method of any one of the preceding items, wherein the hydrophilic component comprises a polymer having a percent water absorption of at least about 1%, at least about 3%, at least about 5%, or even at least about 7% as measured according to gravimetric measurements at 100% relative humidity and at 23° C.

Item 25. The composition, article or method of any one of the preceding items, wherein the hydrophilic component comprises a polymer having a molecular weight of at least about 50000.

Item 26. The composition, article or method of any one of the preceding items, wherein the hydrophilic component comprises a polymer having a molecular weight of no greater than about 300000.

Item 27. The composition, article or method of any one of the preceding items, wherein the hydrophilic component comprises a polymer having a molecular weight in a range of from 50000 to 300000.

Item 28. The composition, article or method of any one of the preceding items, wherein the hydrophilic component is present in the composition or barrier layer in an amount of at least about 0.1 wt. %, at least about 0.5 wt. %, or even at least about 1 wt. %, based on the total dry weight of the hydrophobic & hydrophilic components.

Item 29. The composition, article or method of any one of the preceding items, wherein the hydrophilic component is present in the composition or barrier layer in an amount of no greater than about 40 wt. %, no greater than about 30 wt. %, no greater than about 25 wt. %, no greater than about 20 wt. %, no greater than about 15 wt. %, no greater than about 10 wt. %, or even no greater than about 8 wt. %, based on the total dry weight of the hydrophobic & hydrophilic components.

Item 30. The composition, article or method of any one of the preceding items, wherein the hydrophilic component is present in the composition or barrier layer in an amount in a range of from 0.1 wt. % to 35 wt. %, or even 1 wt. % to 15 wt. %, based on the total dry weight of the hydrophobic & hydrophilic components.

Item 31. The composition, article or method of any one of the preceding items, wherein the composition or barrier layer further comprises a filler.

Item 32. The composition, article or method of any one of the preceding items, wherein the composition or barrier layer further comprises a filler, wherein the composition or barrier layer has a filler content of no greater than about the critical pigment volume concentration of the filler.

Item 33. The composition, article or method of any one of the preceding items, wherein the composition or barrier layer further comprises a filler, wherein the composition or barrier layer has a filler content in a range of from 0 wt % to 85 wt %, based on the total dry weight of the composition or barrier layer.

Item 34. The composition, article or method of any one of the preceding items, wherein the composition or barrier layer further comprises a filler, and wherein the filler comprises a clay, CaCO3, CaSO4, BaSO4, silica, talc, carbon black, diatomaceous earth, alumina, titania, or combinations thereof.

Item 35. The composition or method of any one of the preceding items, wherein a ratio of the volume % of the hydrophobic component to the hydrophilic component is at least about 2:1 and no greater than about 200:1.

Item 36. The article or method of any one of the preceding items, wherein the substrate comprises a building material.

Item 37. The article or method of any one of the preceding items, wherein the substrate comprises a kraft paper facing, scrim, a polymer sheet, or combinations thereof.

Item 38. The article or method of any one of the preceding items, wherein the substrate comprises a textile building material.

Item 39. The article or method of any one of the preceding items, wherein the substrate comprises a non-woven material.

Item 40. The article or method of any one of the preceding items, wherein the substrate comprises a woven material.

Item 41. The article or method of any one of the preceding items, wherein the substrate comprises a non-woven material comprising spun bond or point bond fabrics.

Item 42. The article or method of any one of the preceding items, wherein the barrier layer has a coat weight of at least about 20 gsm.

Item 43. The article or method of any one of the preceding items, wherein the barrier layer has a viscosity of at least about 500 cps at a shear rate of 1 s−1; at a temperature of 21° C., wherein the viscosity of the barrier layer is determined before curing of the barrier layer.

Item 44. The article or method of any one of the preceding items, wherein the barrier layer has a viscosity of at least about 5000 cps at a shear rate of 1 s−1 and has a viscosity of less than 1000 cps at a shear rate of 1000 s−1 at a temperature of 21° C., wherein the viscosity of the barrier layer is determined before curing of the barrier layer.

Item 45. The article or method of any one of the preceding items, wherein the combined thickness of the substrate and the barrier layer is in a range of from 50 um to 1000 um.

Item 46. The composition of any one of the preceding items, wherein the barrier layer is adapted to penetrate into a nonwoven substrate by at least about 5% of the thickness of the barrier layer.

Item 47. The composition of any one of the preceding items, wherein the composition is adapted to penetrate into a nonwoven substrate by no more than 90% of the thickness of the substrate.

Item 48. The article or method of any one of the preceding items, wherein the barrier layer penetrates into the substrate at least about 5% of the thickness of the substrate.

Item 49. The article or method of any one of the preceding items, wherein the article has a water vapor perm rating of about 2.5 perms or less at 45% average RH as tested by ASTM E96 at 21° C.

Item 50. The article or method of any one of the preceding items, wherein the article has a water vapor perm rating of from 6 to 12 perms at 75% average RH as tested by ASTM E96 at 21° C.

Item 51. The article or method of any one of the preceding items, wherein the article has a nail tear resistance of at least about 10 N/5 cm as measured according to EIN 12310-1.

Item 52. The article or method of any one of the preceding items, wherein the article has a tensile strength of at least about 30 N/5 cm as measured according to EIN 12311-2.

Item 53. The article or method of any one of the preceding items, wherein the article has a tape adhesion of at least about 25 N/5 cm as measured according to EIN 12317-2.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

EXAMPLES

Example 1—Permeance

Samples were prepared and tested for water vapor permeance values under ASTM E96 at 21° C. and at relative humilities of 25% RH, 45% RH, 75% RH, and 95% RH.

Samples for water vapor permeance tested were prepared by mixing the ingredients with an air powered cowles blade, or a homogenizer, or by hand for 5 minutes at room temperature. The coatings were applied by wound wire rod (mayer rod) or by a slot die extrusion process at a thickness of approximately 75 microns.

The wt. % values illustrated for the hydrophobic and hydrophilic components are based on the total weight of the hydrophobic and hydrophilic components in the solid film. The wt. % values for the filler are based on total weight of the coating composition.

Components

A—Styron DL-226 was obtained from Styron—This is a styrene-butadiene latex with a low degree of carboxylation and a glass transition temperature of −14° C.

B—Styron DL-490 was obtained from Styron—This is a highly carboxylated styrene butadiene latex with a glass transition temperature of 9° C.

C—PVOH Selvol 9-325 was obtained from Sekisui—This is a pre-dissolved PVOH at 8.5% solids which is 98.4% hydrolyzed with a high molecular weight.

D—PAA Acumer 1510 was obtained from Dow—This is a 25% solids polyacrylic acid.

E—Kaolin clay was obtained from Sigma Aldrich

NW—nonwoven substrate obtained from Hanes under the trade name designation Elite.

SD—slot die coating process

MR—Mayer Rod coating process parative Nylon 2 mil film (Sample 16), and even better than the Nylon 2 mil film. Specifically, sample 9 performs almost exactly as does Sample 16, except that it is more closed at 25% humidity and more open at 95% humidity, both of which are preferable and improvements over the Nylon 2 mil film.

As an illustrative example of a particular advantage of certain embodiments of the present disclosure, namely the particular component ratios, comparing the permeance profiles of samples 1, 2, and 3 from the table, it is clear that the slope increases dramatically as you increase the hydrophilic component.

As an illustrative example of a particular advantage of certain embodiments of the present disclosure, namely the particular materials selected, comparing the permeance profiles of samples 2 and 4 from the table, it is clear that the selection of hydrophobic material can have a significant impact on the permeance profile.

As an illustrative example of a particular advantage of certain embodiments of the present disclosure, namely the particular materials selected, comparing the permeance profiles of samples 5 and 6 from the table, it is clear that the hydrophilic component C is far more effective at tailoring the permeance profile than hydrophilic component D.

As an illustrative example of a particular advantage of certain embodiments of the present disclosure, namely the filler selection, comparing the permeance profiles of samples 3, 7, 9, 10, and 11 from the table, it is clear that the incorporation of the kaolin filler significantly increased the barrier properties at low humidity and increased the vapor permeance at high humidity.

As an illustrative example of a particular advantage of certain embodiments of the present disclosure, comparing the permeance profile of sample 16 to that of the individual components (i.e. samples 12, 13, 14, and 15) from the table, it is clear that none of the components can individually match the performance of nylon.

As an illustrative example of a particular advantage of certain embodiments of the present disclosure, comparing the permeance profile of sample 9 to that of the individual components (samples 12 and 14) from the table, it is clear

TABLE 1

Sample Formulations and Permeance Values

| | Hydrophobic | | Hydrophilic | | Filler | | | Permeance | | | |
|---|---|---|---|---|---|---|---|---|---|---|---|
| Sample | A | B | C | D | E | Substrate | Process | 25% | 45% | 75% | 95% |
| 1 | 96 | | 4 | | | NW | SD | | 2 | 3.4 | 5.3 |
| 2 | 95 | | 5 | | | NW | SD | 1.3 | 3 | 11.7 | 25.1 |
| 3 | 94 | | 6 | | | NW | SD | 1.2 | 3.3 | 16.8 | 43 |
| 4 | | 95 | 5 | | | NW | SD | 0.8 | 15.6 | 55.8 | 152.3 |
| 5 | 95 | | 5 | | | NW | MR | 1 | 2.7 | 12.5 | 31.6 |
| 6 | 95 | | | 5 | | NW | MR | 1 | 1.7 | 3.1 | 4 |
| 7 | 94 | | 6 | | 33 | NW | MR | 0.39 | 0.76 | 7.2 | 27 |
| 8 | 94 | | 6 | | 33 | Kraft | MR | 0.5 | 1.1 | 6 | 26 |
| 9 | 94 | | 6 | | 40 | NW | MR | 0.32 | 1.5 | 8.2 | 34 |
| 10 | 94 | | 6 | | 47 | NW | MR | 0.28 | 1.5 | 9.1 | 38 |
| 11 | 94 | | 6 | | 55 | NW | MR | 0.2 | 1.5 | 9.6 | 41 |
| 12 | | | 100 | | | Kraft | MR | 0 | 21 | 50 | 156 |
| 13 | | | | 100 | | Kraft | MR | 0.8 | 23 | 74 | 142 |
| 14 | 100 | | | | | Kraft | MR | 1.4 | 3.7 | 9 | 20 |
| 15 | | 100 | | | | Kraft | MR | 0.9 | 16 | 40 | 116 |
| 16 | | | | | | Nylon 2 mil a BB | — | 0.8 | 2.4 | 11.9 | 37.1 |

As illustrated above, multiple coated substrates exhibit desirable permeance values comparable to that of the comparative Nylon 2 mil film.

that none of the components can individually match the performance of Sample 9. Accordingly, sample 9 illustrates the synergistic improvement in the permeance profiles in comparison to the individual components separately. This synergism was entirely unexpected.

As an illustrative example of a particular advantage of certain embodiments of the present disclosure, it is clear from the permeance profile of Sample 15 that a highly carboxylated latex can actually be hydrophilic enough to exhibit a strong dependence of permeance on RH; however, the permeance values of such materials at 45% humidity are too high to achieve the performance of Sample 16.

As an illustrative example of a particular advantage of certain embodiments of the present disclosure, namely the robustness of the coating, comparing the permeance profiles of samples 2 and 8 from the table, it is clear that the substrate selection has only a minor impact on performance if the substrate is more vapor open than the coating.

As an illustrative example of a particular advantage of certain embodiments of the present disclosure, namely the robustness of the coating, comparing the permeance profiles of samples 2 and 6 from the table, it is clear that the coating process has little impact on performance.

Example 2: Mechanical Data

The following samples were prepared as follows:

Sample 2A: 94 wt. % of Styron DL-226 and 6 wt. % of PVOH-325, based on the total weight of these two components. The sample further included 33 wt. % of a Kaolin filler, based on the total weight of the composition. This was coated in the machine direction onto Hanes Elite 100 fabric.

Sample 2B: 94 wt. % of Styron DL-226 and 6 wt. % of PVOH-325, based on the total weight of these two components. The sample further included 33 wt. % of a Kaolin filler, based on the total weight of the composition. This was coated in the transverse direction onto Hanes Elite 200 Fabric.

Sample 2C: is a comparative example and include a 50 micron thick Vario KM film which was obtained from Saint-Gobain Corporation and was used as received.

The samples were then tested for initial tensile Strength, tensile strength after UV aging for 180 hours at 0.5 W/m$^2$, and Nail Resistance according to the test methodology described above, with the following results being obtained:

TABLE 2

| Mechanical Performance | | | |
|---|---|---|---|
| | 2A | 2B | 2C |
| Tensile (N/5 cm) | 98 | 197 | 197 |
| Tensile UV Aged (N/5 cm) | 65 | 88 | 64 |
| Nail Resistance (N/5 cm) | 31 | 61 | 15 |

Example 3: Viscosity Measurements

Three Samples were prepared as follows and measured for their viscosity before curing according to the methodology described herein:

Sample 3A: contained 95 wt. % of Styron DL-226 and 5 wt. % of PVOH-325, based on the total weight of these two components.

Sample 3B: contained 94 wt. % of Styron DL-226 and 6 wt. % of PVOH-325, based on the total weight of these two components. The sample further included 33 wt. % of a Kaolin filler, based on the total weight of the composition.

Sample 3C is a comparative sample and contained 100 wt. % of DL 226.

Sample 3D is a comparative sample and contained 100 wt. % of Selvol 9-325.

The results are reported in FIG. 3, which illustrates a graph of the viscosity measured in (Pa*s) at different shear rates measured in s$^{-1}$. As illustrated, the viscosities of Samples 3A and Sample 3B were significantly higher than the comparative Samples 3C and 3D.

What is claimed is:

1. A coating composition adapted to selectively retard water vapor as a function of humidity when cured into a barrier layer, the composition comprising an aqueous dispersion of:
   a. a hydrophobic component, wherein the hydrophobic component comprises or is derived from a latex of styrene butadiene, vinyl acetate ethylene, wax, polyvinyl chloride, polyvinyl butyral, butadiene, or combinations thereof and wherein the hydrophobic component further comprises or is derived from a latex of styrene acrylic, acrylic, vinylidene chloride, polyethylene, polypropylene, or combinations thereof; and
   b. a hydrophilic component present in an amount of at least about 5 wt. % based on a total weight of the hydrophobic and hydrophilic components in a solid coating, wherein the hydrophilic component comprises polyvinyl alcohol (PVOH), poly(vinyl pyrolidone), a salt of polyacrylic acid, poly acrylic acid, a highly carboxylated latex, an amine, an inorganic hydrophilic filler, polyethylene oxide, a vinyl ether, a highly hydrolyzed polymer, or combinations thereof;
   c. wherein the composition once cured is effective to provide a variable water vapor perm rating of about 1 perm or less at 25% average RH and about 15 perms or more at 95% average relative humidity, as tested by ASTM E96 at 21° C. and as tested by coating and curing the composition on a kraft paper.

2. The composition of claim 1, wherein the composition once cured is effective to provide a water vapor perm rating of about 2.5 perms or less at 45% average RH and a water vapor perm rating of between 6 and 12 perms at 75% average RH as tested by ASTM E96 at 21° C. and as tested by coating and curing the composition on a kraft paper.

3. The composition of claim 1, wherein a ratio of the volume % of the hydrophobic component to the hydrophilic component is at least about 2:1 and no greater than about 200:1.

4. The composition of claim 1, wherein the hydrophobic component comprises a water insoluble polymer.

5. The composition of claim 1, wherein the hydrophilic component comprises a material having percent water absorption of at least about 1%.

6. The composition of claim 1, wherein the hydrophobic component comprises the styrene butadiene latex.

7. The composition of claim 1, wherein the hydrophobic component has a % carboxylation of no greater than about 15%.

8. The composition of claim 1, wherein the hydrophobic component has a glass transition temperature (Tg) of no greater than about 35° C.

9. The composition of claim 1, wherein the hydrophobic component has a glass transition temperature (Tg) in a range of from −30 to 35° C.

10. The composition of claim 1, wherein the hydrophobic component is present in the composition in an amount of at least about 15 wt. % based on the total dry weight of the hydrophobic & hydrophilic components.

11. The composition of claim 1, wherein the hydrophobic component is present in the composition in an amount of no greater than about 99 wt. % based on the total dry weight of the hydrophobic & hydrophilic components.

12. The composition of claim 1, wherein the hydrophobic component is present in the composition in a range of from 15 wt. % to 99 wt. % based on the total dry weight of the hydrophobic & hydrophilic components.

13. The composition of claim 1, wherein the hydrophilic component comprises a polymer which, in the absence of cross-linking, is soluble in water.

14. The composition of claim 1, wherein the hydrophilic component comprises polyvinyl alcohol (PVOH) or the salt of polyacrylic acid.

15. The composition of claim 1, wherein the hydrophilic component comprises the inorganic hydrophilic filler.

16. The composition of claim 15, wherein the inorganic hydrophilic filler comprises kaolin clay.

17. The composition of claim 1, wherein the hydrophilic component is present in the composition in an amount of no greater than about 40 wt. % based on the total dry weight of the hydrophobic & hydrophilic components.

18. The composition of claim 1, wherein the hydrophilic component is present in the composition in an amount of no greater than about 30 wt. % based on the total dry weight of the hydrophobic & hydrophilic components.

19. The composition of claim 1, wherein the composition further comprises a filler, wherein the composition has a filler content in a range of from 0 wt. % to 85 wt %, based on the total dry weight of the composition.

20. The composition of claim 19, wherein the filler comprises a clay, $CaCO_3$, $CaSO_4$, $BaSO_4$, silica, talc, carbon black, diatomaceous earth, alumina, titania, or combinations thereof.

* * * * *